(12) United States Patent
Ono et al.

(10) Patent No.: US 6,689,292 B2
(45) Date of Patent: *Feb. 10, 2004

(54) METHOD OF PRODUCING ALUMINATE PHOSPHOR

(75) Inventors: Keiji Ono, Tsukuba (JP); Susumu Miyazaki, Kitasoma-gun (JP)

(73) Assignee: Sumitomo Chemical Company, Limited, Osaka (JP)

( * ) Notice: Subject to any disclaimer, the term of this patent is extended or adjusted under 35 U.S.C. 154(b) by 58 days.

This patent is subject to a terminal disclaimer.

(21) Appl. No.: 10/015,882

(22) Filed: Dec. 17, 2001

(65) Prior Publication Data

US 2002/0088963 A1 Jul. 11, 2002

(30) Foreign Application Priority Data

Dec. 22, 2000 (JP) ........................................ 2000-390709

(51) Int. Cl.⁷ .................. C09K 11/64; C09K 11/55; C09K 11/59; C09K 11/54
(52) U.S. Cl. ............................... 252/301.4 R; 313/643; 313/582; 313/584
(58) Field of Search ................ 252/301.4 R; 313/582, 313/584, 443

(56) References Cited

U.S. PATENT DOCUMENTS 4,840,747 A  6/1989  Fan et al.
6,290,875 B1 *  9/2001  Oshio et al. .......... 252/301.4 R

FOREIGN PATENT DOCUMENTS

DD       226 899 A      9/1985

OTHER PUBLICATIONS

Abstract, XP–002243425, Section Ch, Week 199814, Derwent Publications Ltd., Lond, GB, Class L03, AN 1998–159494.
Abstract, XP–002243426, Section Ch, Week 199845, Derwent Publications Ltd., Lond, GB, Class L03, AN 1998–1531984.
Abstract, XP–002243427, Section Ch, Week 200038, Derwent Publications Ltd., Lond, GB, Class L02, AN 2000–436467.

* cited by examiner

*Primary Examiner*—C. Melissa Koslow
(74) *Attorney, Agent, or Firm*—Sughrue Mion, PLLC

(57) ABSTRACT

It is desired to provide an aluminate phosphor having a high emission luminance, a method for producing the same, and a vacuum ultra-violet radiation excited light emitting element in which the aluminate phosphor is used. A method for producing an aluminate phosphor by mixing an α-alumina powder, an aqueous solution containing a cation of a metal composing the aluminate phosphor, and a precipitant that precipitates the cation, and drying and calcining an obtained mixture of precipitates is provided. The foregoing method is further arranged so that the cation is a cation of at least one metal selected from the group consisting of Ba, Mg, Eu, Mn, Sr, Ca, Tb, Ce, and Zn is provided. An aluminate phosphor in which particles of the aluminate phosphor having a primary particle diameter of 0.05 $\mu$m to 30 $\mu$m account for not less than 80 percent by mass is provided by the foregoing method.

11 Claims, No Drawings

METHOD OF PRODUCING ALUMINATE PHOSPHOR

FIELD OF THE INVENTION

The present invention relates to a method for producing an aluminate phosphor.

BACKGROUND OF THE INVENTION

An aluminate phosphor is used in a vacuum ultra-violet radiation excited light emitting element such as a plasma display panel (hereinafter referred to as PDP) and a rare gas lamp. For instance, in a PDP, a phosphor is applied on inner walls of a multiplicity of discharge microspaces (hereinafter referred to as "display cells") provided in matrix. It should be noted that discharge electrodes provided in each display cell, and a rare gas such as He-Xe, Ne-Xe, or Ar is capsulated in the space of the cell, so that discharge is caused in the rare gas when a voltage is applied to the discharge electrodes, thereby radiating vacuum ultra-violet rays. The phosphor is excited by the vacuum ultra-violet rays, thereby emitting visible rays. Here, by specifying positions of the display cells to emit light, images are displayed. Furthermore, by using phosphors emitting light of blue, green, and red colors that are three primary colors of light, full-color display can be carried out. It is difficult to increase the screen size in the case of cathode ray tubes or color liquid crystal displays, but PDPs make it possible, and further, they can be made flat panel displays. Therefore, expectations are placed on PDPs as displays in public spaces and for use in TV sets with large screens.

Apart from the PDPs, rare gas lamps for illumination are known as vacuum ultra-violet radiation excited light emitting elements. The rare gas lamp has the same configuration as the PDP having only one cell, and a phosphor is applied on inner walls of a light emitting section thereof. In the case of the rare gas lamp also, as in the case of the PDP, vacuum ultra-violet rays are generated by discharge in the rare gas, and the vacuum ultra-violet rays are converted into visible light by the phosphor, whereby light is emitted. The rare gas lamps are used for illumination, and attract attentions from the viewpoint of environment preservation since they do not use mercury, unlike the fluorescent lamps.

Known as the aluminate phosphor is, for instance, a compound containing a complex oxide expressed by a composition formula $x^1M^1O$—$y^1MgO$—$z^1Al_2O_3$ as a substrate, and an activator. As to typical examples thereof, $BaMgAl_{10}O_{17}$:Eu, $BaMgAl_{14}O_{23}$:Eu, etc., which contain Eu as the activator and in which $M^1$ is Ba, are known as blue light emitting phosphors, and $BaAl_{12}O_{19}$:Mn, $BaMgAl_{14}O_{23}$:Mn, etc., which contain Mn as the activator and in which $M^1$ is Ba, are known as green light emitting phosphors.

It is also known that each of these aluminate phosphors is produced by mixing compounds in powder form that contain metal elements composing the aluminate phosphor at a predetermined ratio such that a target aluminate phosphor is generated, and calcining the obtained powder mixture in a reducing atmosphere. For instance, it is known that an aluminate phosphor expressed by a composition formula of $Ba_{0.9}Eu_{0.1}MgAl_{10}O_{17}$ is obtained by mixing a barium compound, a europium compound, a magnesium compound, and an aluminum compound at a ratio of Ba:Eu:Mg:Al= 0.9:0.1:1:10, and calcining the obtained powder mixture in an atmosphere containing hydrogen, that is, a reducing atmosphere.

Such an aluminum phosphate is used in display cells of a PDP or the like. Since a PDP is required to have a high emission luminance, a phosphor for use in display cells of a PDP is also required to have a high emission luminance. Furthermore, a rare gas lamp for illumination is also required to have a high emission luminance, and hence, a phosphor for use in a rare gas lamp is also required to have a high emission luminance.

However, the method in which compounds containing metal elements composing an aluminate phosphor are simply mixed in powder form and a powder mixture obtained is calcined, that is, the method in which a powdery mixture is used as a precursor, has had a drawback in that a phosphor obtained does not have a sufficient emission luminance.

An object of the present invention is to provide an aluminate phosphor having a high emission luminance, a method for producing the same, and a vacuum ultra-violet radiation excited light emitting element in which the aluminate phosphor is used.

SUMMARY OF THE INVENTION

In such a situation, the inventors of the present invention, as a result of earnest studies, found that in the case where a precipitate mixture produced by using an α-alumina powder, an aqueous solution containing a cation of a metal composing the aluminate phosphor, and a precipitant that precipitates the cation is used as a specific precursor to obtain an aluminum phosphor, the obtained aluminate phosphor has a significantly high emission luminance, and consequently they completed the present invention.

More specifically, the present invention is to provide an aluminate phosphor excellent in practical application that is obtained by mixing an α-alumina powder, an aqueous solution containing a cation of a metal composing the aluminate phosphor, and a precipitant that precipitates the cation, and drying and calcining an obtained mixture of precipitates, to provide a method for producing the same, and to provide a light emitting element in which the same is utilized.

The present invention is to provide the foregoing method further arranged so that the aluminate phosphor contains a complex oxide expressed by a composition formula of $x^1M^1O$—$y^1MgO$—$z^1Al_2O_3$ ($M^1$ represents at least one metal element selected from the group consisting of Ba, Sr, and Ca, $x^1$ satisfies $0.5 \leq x^1 \leq 4.5$, $y^1$ satisfies $0 \leq y^1 \leq 4$, and $z^1$ satisfies $0.5 \leq z^1 \leq 20$) as a substrate, and at least one of Eu and Mn as an activator. The present invention is to provide the aforementioned method further arranged so that the aluminate phosphor contains a complex oxide expressed by a composition formula of $x^2CeO_{1.5}$—$y^2M^2O$—$z^2Al_2O_3$ ($M^2$ represents Mg and/or Mn, $x^2$ satisfies $0.9 \leq x^2 \leq 1.1$, $y^2$ satisfies $0.9 \leq y^2 \leq 1.1$, and $z^2$ satisfies $z^2=5.5$) as a substrate, and at least one of Tb and Mn as an activator.

Furthermore, the present invention is to provide an aluminate phosphor obtained by the foregoing producing method in which the aluminate phosphor comprises not less than 80 weight % a primary particle diameter of not less than 0.05 μm and not more than 30 μm. Furthermore, the present invention is to provide a vacuum ultra-violet radiation excited light emitting element in which the foregoing aluminate phosphor is used.

It should be noted the mean primary particle diameter is a number-average value of particle diameters determined using photographs taken by the scanning electronic microscope.

DETAILED DESCRIPTION OF THE INVENTION

The following description will depict the present invention in more detail.

An aluminate phosphor of the present invention is characterized in that an α-alumina powder, an aqueous solution containing a cation of a metal, and a precipitant that precipitates the cation are mixed, and an obtained mixture of precipitates is used as a precursor of the aluminate phosphor.

Here, examples of the cation in the aqueous solution containing the cation of a metal composing the aluminate phosphor include cations of Ba, Mg, Eu, Mn, Sr, Ca, Tb, Ce, and Zn. Examples of aqueous solutions containing such cations include an aqueous solution of a water-soluble salt formed with such a cation, for instance, a halogenide, or a nitrate. Therefore, when a blue light emitting phosphor ($BaMgAl_{10}O_{17}$:Eu, $BaMgAl_{14}O_{23}$:Eu, etc.) is produced, an aqueous solution of a water-soluble salt containing ions of Ba, Mg, and Eu may be used. Likewise, when a green light emitting phosphor ($BaAl_{12}O_{19}$:Mn, $BaMgAl_{14}O_{23}$:Mn, etc.) is produced, an aqueous solution of a water-soluble salt containing ions of Ba, Mg, and Mn may be used.

The water used for preparing the aqueous solution containing the cation in the producing method of the present invention may be any water as long as it is capable of dispersing the α-alumina powder. Furthermore, the water may contain a disperser such as stearic acid, polycarboxylic acid ammonium salt, or the like.

As the α-alumina powder, an α-alumina powder having a mean primary particle diameter of not less than 0.05 $\mu$m and not more than 30 $\mu$m is preferably used.

In the case where the phosphor is applied on a back plate side of the display cells of a PDP, that is, on side and bottom surfaces of the display cells, the α-alumina powder preferably has a mean primary particle diameter of from about 0.3 $\mu$m to about 30 $\mu$m, and more preferably, from about 0.3 $\mu$m to about 5 $\mu$m. If the mean primary particle diameter is excessively great, a produced aluminate phosphor also may have particles great in size, and it may be difficult to secure appropriate spaces for generating plasma in display cells that usually has a width of approximately 100 $\mu$m each. On the other hand, if the mean primary particle diameter is excessively small, a produced aluminate phosphor also may have particles small in size, thereby exhibiting a dispersibility different from a conventionally used phosphor (having a mean primary particle diameter of 1 $\mu$m to 5 $\mu$m) when a phosphor paste is prepared. Therefore, this may make it difficult to provide the phosphor on the bottom and side surfaces of the display cells through a conventional process.

Furthermore, in the case where phosphor particles are provided on a front plate side, that is, upper surfaces of the display cells in the PDP, in addition to the side walls and bottoms of the display cells thereof, to further increase the emission luminance. In this case, the α-alumina powder preferably has a primary particle diameter of from about 0.05 $\mu$m to about 0.3 $\mu$m, more preferably, from about 0.07 $\mu$m to about 0.28 $\mu$m, and further preferably, from about 0.1 $\mu$m to about 0.25 $\mu$m. If the primary particle diameter is excessively great, a visible light transmittance (transparency) of the phosphor on the front side may decrease, and visible light emitted from the phosphor provided on the bottom and side surfaces may be blocked. On the other hand, if the powder is excessively fine, the dispersion of the powder in the aqueous solution containing the cation may become difficult.

As the α-alumina powder used in the producing method of the present invention, an α-alumina powder made of alumina particles having substantially no fractured plane is preferable from the viewpoint of low aggregation.

The precipitant for precipitating the cation is preferably at least one selected from the group consisting of oxalic acid, ammonium carbonate, ammonium hydrogen-carbonate, sodium carbonate, sodium hydrogen-carbonate, ammonia, sodium hydroxide, acetic acid, and tartaric acid. Oxalic acid, ammonium carbonate, and ammonia are particularly preferably used from the viewpoint of the easily reacting with the cation and causing the precipitate mixture to be deposited on surfaces of particles of the α-alumina powder. A quantity of the precipitant to be used is preferably equal to or more than a stoichiometric quantity required for causing cations other than those of aluminum cation to be deposited as precipitates, and more preferably, not less than three times the foregoing stoichiometric quantity.

The present invention is characterized in that an α-alumina powder, an aqueous solution containing a cation of a metal composing the aluminate phosphor, and a precipitant that precipitates the cation are mixed, and an obtained mixture of precipitates is used as a precursor of an aluminate phosphor. Here, the mixing method is not particularly limited, but preferably used is a method of dispersing an α-alumina powder in an aqueous solution containing a cation of a metal composing the aluminate phosphor, and subsequently adding a precipitant thereto while stirring. The prepared mixture of precipitates is normally dried after being separated by filtering, centrifugal separation, or another method. A drying temperature is preferably in a range of about 20° C. to about 300° C., and more preferably, in a range of about 90° C. to about 200° C. Examples of a method of directly drying the same include evaporation, and spray-drying in which the mixture is dried while it is being granulated.

Subsequently, the dried precursor is calcined, and the calcining may be carried out by any method. For instance, the precursor may be charged in an alumina boat and calcined in a predetermined gas atmosphere at a temperature in a range of about 1000° C. to about 1700° C., so that an aluminate phosphor is obtained.

For instance, in the case where a precursor of a blue light emitting phosphor ($BaMgAl_{10}O_{17}$:Eu, $BaMgAl_{14}O_{23}$:Eu, etc.) is calcined, it is preferable to apply a calcining operation in a reducing atmosphere at a temperature in a range of about 1000° C. to about 1700° C. for about 0.5 to about 40 hours at least once. The calcining temperature is more preferably in a range of about 1200° C. to about 1550° C. Examples of a method for obtaining a reducing atmosphere include a method in which a block of graphite is placed in a boat in which the precursor is charged, a method in which the precursor is calcined in a nitrogen-hydrogen atmosphere or in a rare gas-hydrogen atmosphere, etc. Water vapor may be contained in such an atmosphere.

In the case where a precursor of a green light emitting phosphor ($BaAl_{12}O_{19}$:Mn, $BaMgAl_{14}O_{23}$:Mn, etc.) is calcined, it is preferable to apply a calcining operation in an ambient atmosphere or an oxygen atmosphere at a temperature in a range of about 1000° C. to about 1700° C. for about 0.5 to about 40 hours at least once. The calcining temperature is more preferably in a range of about 1200° C. to about 1550° C.

After calcining, treatments such as dispersion, washing, drying, and screening may be applied to the obtained aluminate phosphor.

In the case where an α-alumina powder has a mean primary particle diameter of not less than 0.05 $\mu$m and not more than 30 μm, an aluminate phosphor obtained by the producing method of the present invention normally contains not less than 80 weight % of particles having a primary particle diameter of not less than 0.3 μm and not more than 30 μm, and the distribution range of the perticles is narrower than that of the particles of aluminate phosphor prepared by a conventional method. The aluminate phosphor obtained by the producing method of the present invention has a high luminance, and since the granular variation is in a narrow range, this makes it possible to apply the phosphor efficiently in discharge microspaces such as display cells of a PDP. Therefore, in the case where the phosphor is used in display cells of a PDP, a high luminance PCP can be produced.

In the case where the α-alumina powder has a mean primary particle diameter of not less than 0.05 μm and less than 0.3 μm, an aluminate phosphor obtained by the producing method of the present invention normally contains not less than 80 weight % of particles having a primary particle diameter of not less than 0.05 μm and not more than 0.3 μm, preferably not less than 80 weight % of particles having a primary particle diameter of not less than 0.07 μm and not more than 0.28 μm. Hence, the aluminate phosphor has a primary particle diameter smaller than that of an aluminate phosphor obtained by a conventional method, and contains fewer oversize particles. The aluminate phosphor obtained by the producing method of the present invention has a high luminance, and is suitable as a phosphor to be applied on a front panel side of display cells of a PDP since the phosphor has a small primary particle diameter. Furthermore, since it contains fewer oversize particles, it can be applied thereon efficiently.

Since an aluminate phosphor obtained by the present invention has a small primary particle diameter and contains fewer oversize particles, it particularly has excellent light emitting characteristics when excited by vacuum ultra-violet rays. Hence, it is significantly advantageous as a phosphor for use in a vacuum ultra-violet radiation excited light emitting element that can be used in various displays such as a PDP. Furthermore, an aluminate phosphor obtained by a producing method of the present invention exhibits excellent light emitting characteristics not only when excited by vacuum ultra-violet rays, but also when excited by ultra-violet rays, cathode rays, or X-rays. In other words, the present invention can be excited by a variety of energy including vacuum ultra-violet rays, ultra-violet rays, cathode rays (electron beams), and X-rays.

An aluminate phosphor obtained by the producing method of the present invention has a small cohesive power between primary particles, and hence, it allows a post-treatment such as fracture or the like to be simplified.

EXAMPLES

The following description will depict examples of the present invention in more detail. The present invention, however, is not limited by the examples. In the examples, an α-alumina powder that was prepared by a method disclosed by JP 7(1995)-206430 A, was composed of particles having substantially no fractured plane, had a purity of 99.99 mass %, and had a mean primary particle diameter of 0.7 μm or 0.2 μm was used as a material.

Example 1

100 g of water in which 6.2 g of the α-alumina powder having a mean primary particle diameter of 0.7 μm was dispersed, and an aqueous solution obtained by dissolving 2.69 g of barium chloride dihydrate, 0.45 g of europium chloride hexahydrate, and 2.49 g of magnesium chloride hexahydrate in 20 g of pure water, were mixed. 200 g of an aqueous solution in which 10 g of oxalic acid was dissolved was added to the mixture while stirred, and obtained precipitates were separated by filtering, and were dried so that a precursor of a blue light emitting phosphor was prepared. The obtained precursor was calcined in a weakly reducing atmosphere containing 2 percent by volume (vol %) of hydrogen and 98 vol % of argon at 1450° C. for two hours, whereby a blue light emitting phosphor was obtained. It was found by means of the scanning electronic microscope that in the obtained blue light emitting phosphor, all the particles had a primary particle diameter of not more than 1 μm.

When irradiated with ultra-violet rays by EXCIMER 146 nm LAMP (produced by Ushio Inc.) in a vacuum chamber with a vacuum of not more than 6.7 Pa ($5 \times 10^{-2}$ Torr), the obtained blue light emitting phosphor emitted intense blue light. The emission luminance was measured by a luminance meter (Luminance Meter BM-7 produced by Topcon Corporation) and determined to be 45 cd/m$^2$, which is higher than those of conventional articles. It should be noted that when excited with ultra-violet rays of 254 nm or 365 nm, cathode rays, or X-rays, the foregoing blue light emitting phosphor exhibited high-luminance blue light emission. Furthermore, phase identification was carried out with respect to the obtained phosphor by means of an X-ray micro-diffraction analyzer (Rigaku RU-200 rotating anode X-ray generator produced by Rigaku/MSC). As a result, it was found that the phosphor had a monophase of $BaMgAl_{10}O_{17}$:Eu.

Example 2

100 g of water in which 6.2 g of the α-alumina powder having a mean primary particle diameter of 0.2 μm was dispersed, and an aqueous solution obtained by dissolving 2.69 g of barium chloride dihydrate, 0.45 g of europium chloride hexahydrate, and 2.49 g of magnesium chloride hexahydrate in 20 g of pure water, were mixed. 200 g of an aqueous solution in which 10 g of oxalic acid was dissolved was added to the mixture while stirred, and obtained precipitates were separated by filtering, and were dried so that a precursor of a blue light emitting phosphor was prepared. The obtained precursor was calcined in a weakly reducing atmosphere containing 2 vol % of hydrogen and 98 vol % of argon at 1450° C. for two hours, whereby a blue light emitting phosphor was obtained. It was found by means of the scanning electronic microscope that in the obtained blue light emitting phosphor, all the particles had a primary particle diameter of not more than 0.3 μm.

When irradiated with ultra-violet rays by EXCIMER 146 nm LAMP (produced by Ushio Inc.) in a vacuum chamber with a vacuum of not more than 6.7 Pa ($5 \times 10^{-2}$ Torr), the obtained blue light emitting phosphor emitted intense blue light. The emission luminance was measured by a luminance meter (Luminance Meter BM-7 produced by Topcon Corporation) and determined to be 42 cd/m$^2$, which is higher than those of conventional articles. It should be noted that when excited with ultra-violet rays of 254 nm or 365 nm, cathode rays, or X-rays, the foregoing blue light emitting phosphor exhibited high-luminance blue light emission. Furthermore, phase identification was carried out with respect to the obtained phosphor by means of an X-ray micro-diffractometer (Rigaku RU-200 rotating anode X-ray generator produced by Rigaku/MSC). As a result, it was found that the phosphor had a monophase of $BaMgAl_{10}O_{17}$:Eu.

Comparative Example 1

3.62 g of the α-alumina powder having a mean primary particle diameter of 0.7 μm, 1.26 g of barium carbonate, 0.12 g of europium oxide, and 0.69 g of basic magnesium carbonate were mixed sufficiently by a ball mill, and an obtained precursor was calcined in a weakly reducing atmosphere containing 2 vol % of hydrogen and 98 vol % of argon at 1450° C. for two hours, whereby a blue light emitting phosphor was obtained.

When irradiated with ultra-violet rays by EXCIMER 146 nm LAMP (produced by Ushio Inc.) in a vacuum chamber with a vacuum of not more than 6.7 Pa ($5 \times 10^{-2}$ Torr), the obtained blue light emitting phosphor emitted blue light. The emission luminance was measured by a luminance meter (Luminance Meter BM-7 produced by Topcon Corporation) and determined to be 32 cd/m$^2$, which is lower than those of the blue light emitting phosphors obtained by the foregoing examples.

According to the present invention, it is possible to produce an aluminate phosphor that has a small primary particle diameter, has a small cohesion power between primary particles, and has a high emission luminance. The aluminate phosphor has a great industrial advantage as a phosphor for use in vacuum ultra-violet radiation excited light emitting elements such as various displays including PDP and rare gas lamps.

What is claimed is:

1. A method for producing an aluminate phosphor, comprising:

mixing an α-alumina powder, an aqueous solution containing a cation of a metal composing the aluminate phosphor, and a precipitant that precipitates the cation; and drying and calcining the mixture of precipitates.

2. The method according to claim 1, wherein the cation is a cation of at least one metal selected from the group consisting of Ba, Mg, Eu, Mn, Sr, Ca, Tb, Ce, and Zn.

3. The method according to claim 1, wherein the calcining is carried out at a calcining temperature in a range of 1000° C. to 1700° C.

4. The method according to claim 1, wherein the α-alumina powder has a mean primary particle diameter of 0.05 μm to 30 μm.

5. The method according to claim 1, wherein the aluminate phosphor comprises a complex oxide as a substrate and at least one of Eu and Mn as an activator, the complex oxide being expressed by a composition formula: $x^1M^1O-y^1MgO-z^1Al_2O_3$ where:

$M^1$ represents at least one metal element selected from the group consisting of Ba, Sr, and Ca;

$x^1$ satisfies $0.5 \leq x^1 \leq 4.5$;

$y^1$ satisfies $0 \leq y^1 \leq 4$; and $z^1$ satisfies $0.5 \leq z^1 \leq 20$.

6. The method according to claim 1, wherein the aluminate phosphor comprises a complex oxide as a substrate and at least one of Tb and Mn as an activator, the complex oxide being expressed by a composition formula:

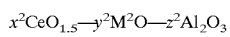

where:

M represents Mg and/or Mn;

$x^2$ satisfies $0.9 \leq x^2 \leq 1.1$;

$y^2$ satisfies $0.9 \leq y^2 \leq 1.1$; and $z^2$ satisfies $z^2 = 5.5$.

7. The method according to claim 1, wherein the α-alumina powder comprises α-alumina particles that have substantially no fractured plane.

8. The method according to claim 1, wherein the precipitant is at least one selected from the group consisting of oxalic acid, ammonium carbonate, ammonium hydrogen-carbonate, sodium carbonate, sodium hydrogen-carbonate, aqueous solution of ammonia, sodium hydroxide, acetic acid, and tartaric acid.

9. An aluminate phosphor obtained by the method according to claim 1.

10. The aluminate phosphor according to claim 9, wherein the aluminate phosphor comprises not less than 80 weight % of particles having a primary particle diameter of 0.05 μm to 30 μm.

11. A vacuum ultra-violet radiation excited light emitting element comprising the aluminate phosphor according to claim 10.

* * * * *